United States Patent [19]

Frische et al.

[11] Patent Number: 5,514,790

[45] Date of Patent: May 7, 1996

[54] STARCH INTERMEDIATE PRODUCT, A PROCESS FOR PRODUCING A STARCH INTERMEDIATE PRODUCT, AND A PROCESS FOR FURTHER PROCESSING OF A STARCH INTERMEDIATE PRODUCT

[75] Inventors: Rainer Frische, Frankfurt; Bernd Best, Moerfelden; Hermann Schomann, Langen, all of Germany; Heinz G. Hoff, Domat/Ems, Switzerland

[73] Assignee: EMS-Inventa AG, Zürich, Switzerland

[21] Appl. No.: 427,229

[22] Filed: Apr. 24, 1995

Related U.S. Application Data

[62] Division of Ser. No. 92,415, Jul. 16, 1993, Pat. No. 5,430,140.

[30] Foreign Application Priority Data

Jul. 16, 1992 [DE] Germany .......................... 42 23 471.9

[51] Int. Cl.⁶ .......................... C08B 31/00; C08B 33/00; C08B 30/20
[52] U.S. Cl. .......................... 536/102; 536/104; 536/105; 536/107; 536/108; 536/110; 536/111
[58] Field of Search ..................................... 536/102, 104, 536/105, 107, 108, 110, 111

[56] References Cited

U.S. PATENT DOCUMENTS

| | | |
|---|---|---|
| 2,572,923 | 10/1951 | Gaver et al. . |
| 2,627,516 | 2/1953 | Lohmar, Jr. . |
| 2,902,336 | 9/1959 | Hiemstra et al. .......................... 536/102 |
| 3,549,619 | 12/1970 | Mark et al. . |

FOREIGN PATENT DOCUMENTS

| | | |
|---|---|---|
| 1567364 | 8/1970 | Germany . |
| 1567379 | 2/1971 | Germany . |
| 1302942 | 1/1973 | United Kingdom . |

OTHER PUBLICATIONS

Whistler, Roy Lester et al., "Polysaccharide Chemistry" Academic Press, Inc. Publishers, New York, pp. 272–274 (Sep. 1972).
Chemical Abstracts, vol. 86, p. 122, No. 86:74848e (1977).
Wootton, M. et al., "Alkali Gelatinisation of Wheat Starch," Stärke, 41, Nr. 7, pp. 261–265 (1989).
Whistler, Roy L. et al. (editors), *Starch: Chemistry and Technology*, vol. 1, Academic Press, pp. 304, 305, and 440–443 (1965).

*Primary Examiner*—Nathan M. Nutter
*Attorney, Agent, or Firm*—Spencer & Frank

[57] ABSTRACT

A process for producing a starch intermediate product in which the reactive hydroxy groups are activated by swelling and disintegrating starch with dilute aqueous-alkali lye, precipitating the disintegrated starch from an aqueous-alkali solution by adding a precipitant which is miscible with water, separating the precipitated disintegrated starch, which exists in a highly activated form, from the filtrate producing a starch intermediate product, and drying the starch intermediate product. A starch intermediate product produced by this process results in a starch which exists in a highly activated form but which is stable in storage.

31 Claims, No Drawings

STARCH INTERMEDIATE PRODUCT, A PROCESS FOR PRODUCING A STARCH INTERMEDIATE PRODUCT, AND A PROCESS FOR FURTHER PROCESSING OF A STARCH INTERMEDIATE PRODUCT

CROSS REFERENCE TO RELATED APPLICATION

This application claims the priority of application Ser. No. DE P 42 23 471.9 filed Jul. 16th, 1992 in Germany, and is a division of U.S. application Ser. No. 08/092,415, filed Jul. 16, 1993 now U.S. Pat. No. 5,430,140, both of which are incorporated herein by reference the subject matter of which is incorporated herein by reference.

1. Field of the Invention

This invention relates to (1) a process for producing a starch intermediate product in which the reactive hydroxy groups of a starch are activated; (2) the starch intermediate product which is produced by this process, in which the starch exists in a highly activated form but which is stable in storage; and (3) a process for the further modification of the starch intermediate product by reaction of the highly activated starch with modifiers. This modified starch can be further processed with additives to form starch materials which may be further processed into mouldings or cast sheets.

2. Description of the Related Art

It is desirable for a variety of reasons to chemically modify starch and amylose, i.e. to convert them into derivatives. The highly derivatized starches and amyloses having a degree of substitution of about 2 and higher are of particular interest for the production of products having properties which are significantly different from starch. Preferred starch and amylose derivatives are starch acyl and amylose acyl compounds, in particular starch acetate and amylose acetate.

According to the prior art, starch and amylose have to be derivatized under aggressive conditions. The production of starch and amylose acetates is described in Houben-Weyl, *Methoden der organischen Chemie* [Organic Chemical Processes], Part III, 4th Edition, page 2153 et seq. or in U.S. Pat. No. 3,549,619.

These aggressive conditions include high reaction temperatures; concentrated reagents such as anhydrides, acids, and, in particular, lyes such as 50% sodium hydroxide solution for activation of the starch; and very long reaction times such as 5 hours and longer for degrees of substitution of 2.5 and higher. This results in chain splitting and decomposition reactions. The chain length of the resultant starch and amylose compound is considerably reduced relative to the starting macromolecule starch or amylose. If amines such as pyridine are used instead of the lyes, they can only be separated from the acylated product with extreme difficulty. The characteristic odor, which is peculiar to the chemical category of amines, is unpleasant in the acylated product even in small contaminating quantities.

In addition to the above-mentioned chain degradation, deposition reactions, which lead to intensively colored impurities, take place in all derivatization and acylation processes according to the prior art. The separation of these intensively colored impurities from the desired colorless starch or amylose acyl product is extremely difficult and sometimes impossible.

The described disadvantages and problems are particularly pronounced during the far-reaching acylation of amylose and amylose-rich starches by known processes. Due to the linear chain structure of the amylose in contrast to the branched chain structure of the amylopectin, chain splitting is particularly pronounced during the modification reaction and is detrimental to the subsequent production of materials. Furthermore, because of the linear chain structure of the amylose, the ability to form complex polar and non-polar substances complicates the separation of the undesirable reaction byproducts and the recovery of pure amylose or high amylose starch acyl compounds.

A further disadvantage of the prior art is that the acylation of the individual molecules does not take place uniformly. Because the solid starch particles have to be derivatized from the exterior inwardly, the first acylated macromolecules are exposed to the aggressive derivatization conditions for a longer time than the last reacted ones. As a result, the first acylated molecules suffer chain breakages more frequently and are also more highly derivatized, i.e., they have a higher degree of substitution than the last reacted molecules. The resultant derivatized product therefore consists of acyl compounds having different degrees of substitution. In other words, the derivatization of the starch or the amylose is not homogeneous.

SUMMARY OF THE INVENTION

Accordingly, an object of the present invention is to overcome the disadvantages of the above-mentioned prior art and to provide a process for producing homogeneously derivatized starch and amylose, the original chain length of the macromolecules being substantially maintained and the derivatized products optionally being obtained in pure form by mere reprecipitation.

It has unexpectedly been found that any starch may be digested with dilute alkali lye and may be precipitated as a solid. A highly reactive isolatable starch intermediate product is obtained. Surprisingly, the activity of this starch intermediate, in the dry state, is maintained for a prolonged period. This advantageous benefit allows the starch to be stored in a highly activated form for further processing to other derivatization products.

According to the present invention, in the process for producing a starch intermediate product, the reactive hydroxy groups of a starch are activated by the following steps:

(a) swelling and disintegrating starch with dilute aqueous-alkali lye;

(b) precipitating the disintegrated starch from an aqueous alkaline solution by adding a precipitant which is miscible with water;

(c) separating the precipitated disintegrated starch, which exists in a highly activated form, from the filtrate producing a starch intermediate product; and (d) drying the starch intermediate product.

DESCRIPTION OF THE PREFERRED EMBODIMENTS

Any starch may be converted to the highly activated starch intermediate product, which is stable in storage, by performing this activation process according to the present invention. The starch used has an amylose content of up to by weight, i.e., pure amylose. Low amylose starch types may also be activated by the process. Starches having amylose contents of at least (1) 50% by weight are preferred; (2) at least 70% by weight are more preferred; and (3) at least 80% by weight are most preferred.

In step (a), the starch is swollen and disintegrated with a dilute aqueous-alkali lye which is preferably a sodium or potassium hydroxide solution and which has a concentration of 0.5 to 10% by weight. The preferred concentration is 1 to 5% by weight, and more preferably, 3 to 4% by weight. It is used in quantities of 3 to 20% by weight, preferably 10 to 15% by weight, based on the quantity of solid sodium hydroxide relative to the starch. Temperatures range from 20° to 100° C., preferably 30° to 60° C., and more preferably 35° to 45° C. The reaction-time periods range from 0.5 to 3 hours, preferably 1 to 2 hours. A starch paste in the form of a high viscosity solution is produced.

In step (b), the starch is then precipitated from this high viscosity alkaline solution without neutralization. Alcohols are the preferred precipitants. Methanol and ethanol are particularly preferred precipitants. Virtually the entire quantity of alkali passes into the filtrate.

In step (c), the precipitated starch is then separated from the filtrate. All impurities remain in the alkaline filtrate. Optionally, subsequent washing is performed using precipitants or purification is performed by mere reprecipitation.

In step (d), the starch intermediate product, which now exists in a highly activated form, is dried. The starch intermediate product is stable in storage and it may be further processed in a simple manner, particularly in an anhydrous or non-aqueous medium, to form desired derivatives.

Further processing of the isolated starch intermediate product is achieved by chemically modifying the starch. The starch is derivatized by reaction of its highly activated hydroxy groups with derivatization agents selected from the group consisting of ether, ester, urethane, carbamate and/or acetyl forming substances. A preferred modification is the reaction with alkylene oxides, in particular with ethylene oxide and/or propylene oxide. A more preferred derivatization process is the reaction with organic acids and/or their derivatives such as carboxylic acid anhydrides and carboxylic acid chlorides. Reactions with saturated aliphatic carboxylic acids with 1 to 20 carbon atoms are preferred. Acylation with acetic acid and/or palmitic acid and/or derivatives thereof is most preferred.

Any desired degree of substitution to the maximum value of 3.0 can be achieved during derivatization. Degrees of substitution of 1.5 to 3.0 are preferred for derivatives having properties differing from starch. Those with degrees of substitution of 2.0 to 3.0 being particularly preferred. For derivatives having a starch-like character, degrees of substitution of 0.03 to 0.45 are preferred and those with 0.20 to 0.40 are particularly preferred.

The process for the further processing of the starch intermediate product also includes the processing of the homogeneously derivatized starch to starch materials using plasticisers. Thus, for example, diacetin, triacetin and/or citric acid esters such as "CITROFLEX" may be used as plasticisers for starch acetate. Starch derivatives having an amylose content of at least 50% by weight, preferably at least 70% by weight, more preferably at least 80% by weight or pure amylose derivatives are particularly suitable for the production of starch materials.

Starch derivatives which have been obtained by derivatization of a cornstarch or peastarch are preferred for the further processing to starch materials owing to their particular properties.

According to the present invention, the process for the further processing of the starch intermediate product also includes the thermoplastically processing of the starch material to mouldings by thermopressing, extrusion or injection moulding or to films or sheets by casting from a solution or dispersion.

Preferred embodiments are blown films and flat films.

The starch acyl compounds produced according to the present invention have clearly altered properties in comparison with those obtained according to the prior art. Thus, acyl compounds, according to the present invention, dissolve completely in the solvents which are suitable for them such as acetone, chloroform and acetic esters of the starch acyl compounds having a high degree of substitution. More or less high-viscosity liquids are formed depending on the concentration. This also applies to starch acyl compounds having degrees of substitution which are clearly lower than 2.5.

In contrast, starch acyl compounds produced according to the prior art do not dissolve completely in chloroform and acetic ester even at degrees of substitution of almost 3. Rather, a clearly discernible cloudiness remains. The lower the degree of substitution of the starch acyl compounds produced according to the prior art is, the more pronounced is this cloudiness. Cloudy flocculations are discernible in the respective solvents with a degree of substitution of 2.5 but not in those produced according to the present invention. The starch acyl compounds produced according to the present invention, therefore, have a more homogeneous dissolving behavior than those produced according to the prior art with an identical degree of substitution.

Similarly, the viscosity of the starch acyl compounds obtained according to the prior art differs greatly in comparison to those acyl compounds produced according to the present invention. This difference occurs even though the substitution is identical on average and there is an identical solvent to solid ratio.

The starch acyl compounds of the present invention, which are dissolved in a solvent, exhibit excellent film-forming properties. Thus, films which have been produced by the casting process from starch compounds according to the present invention exhibit brilliant transparency. If this transparency and these film forming properties are compared with starch acyl compounds produced according to the prior art, distinct differences can also be seen. Known acyl compounds, in particular those having a low degree of substitution, invariably have "specks" and cloudiness. Brilliantly transparent films cannot be produced with starch acyl compounds having degrees of substitution below 2.5 produced according to the prior art. The starch acyl compounds produced by the process according to the present invention yield films with brilliant transparency even using starch acyl compounds with low degrees of substitution.

Products according to the present invention differ not only in their solubility, their film forming character and in the behavior of the films, but also in the thermoplastically processed starch material moulding compositions. Thus, the elongation, the elasticity, the resistance to creasing, the glass transition temperature and the like, of starch acyl compounds according to the present invention differ from those starch acyl compounds which have been produced and similarly processed according to the prior art.

The advantages of the present invention, when compared with the prior art, are as follows:

(a) a starch intermediate product is provided, in which the hydroxy groups are uniformly activated and which do not lose their activation even after prolonged storage;

(b) only a very dilute lye has to be used in the activation process, making it more environment friendly;

(c) low temperatures suffice in the activation process, saving energy and costs;

(d) only short reaction times are required in the activation process, also saving energy and costs;

(e) owing to the extremely mild reaction conditions in the activation process, chain splitting reactions do not take place, i.e. the chain length of the starch used is maintained;

(f) owing to the extremely mild reaction conditions in the activation process, no or substantially fewer decomposition products or impurities are formed;

(g) decomposition products and impurities remain in the filtrate or may be removed from the product by mere reprecipitation, the solvent or precipitant being recovered by distillation;

(h) starch derivatives, in particular those having high degrees of substitution (which are not accessible according to the prior art) may be obtained from the highly activated starch intermediate product with substantially shorter reaction times and mild reaction conditions (i.e., derivatization reactions according to the present invention run three to four times as rapidly as those according to the prior art);

(i) the yield of the starch derivatives is more than 90% (i.e., yield is based on the starch intermediate product used which exists in a highly activated form);

(j) derivatization of the starch intermediate product yields very homogeneous derivative products having new properties which were not formerly available according to the prior art.

EXAMPLES

The following examples illustrate but do not restrict the invention.

PRODUCTION OF STARCH INTERMEDIATE PRODUCT ACCORDING TO THE INVENTION

Example 1

150 g of HYLON VII (cornstarch having an amylose content of about 70% by weight) were suspended in 500 ml of water. The mixture was suction filtered after stirring for 30 minutes and was stirred again in 500 ml of water in a 2000 ml round flask. 15 g of sodium hydroxide, dissolved in 200 ml of water, were then added and were kept at 40° C. for 90 minutes, the reaction solution turning yellow. The resultant starch paste had roughly the viscosity of honey. After cooling, the starch was precipitated with 300 ml of methanol. After homogenization on an Ultraturax, the precipitated starch was suction filtered and again homogenized twice on the Ultraturax with 1000 ml of methanol in each case. The suction filtered starch was washed on the frit with 500 ml of methanol. The still moist product was dried for about 1 hour on a vacuum rotary evaporator at 400° C. and 100 mbar. After being spread over filter paper and dried in air overnight, 131.5 g of powdered starch intermediate product in highly activated form were obtained.

Example 2

A Starch intermediate product in highly activated form was produced from 250 g of cornstarch having an amylose content of 85% by weight, 800 ml of water and 25 g of sodium hydroxide dissolved in 300 ml of water as well as 3000 ml of methanol, as in Exhibit 1. After drying in a vacuum desiccator, the yield was 267 g.

Example 3

1250 g of jet boiler solution of HYLON VII (Emslad starch, 20%), 25 g of sodium hydroxide dissolved in 100 ml of water were kept at 40° C. for 60 minutes in an oil bath as in Example 1. Precipitation was then carried out with methanol/acetone. 284 g of starch intermediate product having residual moisture of 11.5% was produced.

FURTHER PROCESSING OF THE STARCH INTERMEDIATE PRODUCT

Example 4

Production of starch acetate having a degree of substitution of about 2.5

Subsequent acylation was carried out in a reaction apparatus consisting of a 2000 ml three-neck flask, KPG stirrer, a reflux condenser and a dropping funnel.

100 g of starch intermediate product from Example 1 were heated for 1 hour with 326 ml of acetic anhydride in an oil bath at a temperature of 140° C. (internal temperature about 120° C.). A honey-like mass with a silky lustre was produced. 45 ml of denatured ethanol were then added slowly dropwise. After stirring for 30 minutes, 20 ml of ethanol were distilled over. After cooling to 80° C., a total of 1500 ml of methanol were added. After further cooling, the mixture was suction filtered, stirred twice with 1000 ml of methanol in each case, mixed with the Ultraturax and then suction filtered. After washing over a suction filter with 500 ml of methanol, the mixture was suction filtered and the starch derivative dried in air. 140 g of starch acetate having a degree of substitution of about 2.5 to 2.56 were produced.

Example 5

Production of starch acetate having a degree of substitution of about 2.8

Example 4 was repeated but the reaction time was 3 hours instead of 1 hour. 132 g of starch acetate having a degree of substitution of about 2.8 to 2.84 were produced.

Example 6

Production of a mixed starch ester from palmitic acid and acetic anhVdride (DS about 2.6).

50 g of starch intermediate product from Example 1 with 165 ml of acetic anhydride were heated at a temperature of 140° C. in an oil bath with reflux stirring. The mixture was almost clear after 5 minutes. 13 g of palmitic acid dissolved in 20 ml of acetic anhydride were then added. 23 ml of denatured ethanol were added after a reaction time of 60 minutes. After a further running time of 30 minutes, precipitation was carried out with a total of 500 ml of methanol, the product being produced in the form of fine granules. After washing twice with 500 ml of water in each case, the mixture was suction filtered and the starch derivative dried in air. 77 g of fine-grained powder were produced; the degree of substitution was about 2.6 to 2.62.

Example 7

Production of starch acetate having a degree of substitution of about 2.9

119 g of starch acetate with a degree of substitution of about 2.85 to 2.9 were obtained from 100 g of starch intermediate product from Example 2 as in Example 4.

Example 8

Production of starch acetate having a degree of substitution of about 3

50 g of starch intermediate product from Example 3 and 165 ml of acetic anhydride were heated in an oil bath at about 140° C. for 105 minutes. 23 ml of denatured ethanol and 500 ml of methanol were added as in Example 4 after cooling to about 96° C. After suction filtering, washing twice with 250 ml of methanol in each case, and air drying, 66 g of starch acetate having a degree of substitution of about 2.95 to 3 were obtained.

Examples 9 to 11

Production of pressed sheets 3.5 g of starch derivative from Examples 4 (Example 9), 6 (Example 10) and 7 (Example 11) were thoroughly mixed with 1.5 g of triacetin in each case and were left to stand for 20 to 30 minutes. A sheet was then pressed at 150° C. Pressing conditions were as follows:

| Example 9: | 5 t/several times | 30 seconds |
| --- | --- | --- |
| Example 10: | 10 t/twice | 60 seconds |
| Example 11: | 5 t/three times | 30 seconds |

Clear transparent flexible sheets were obtained in each case.

Examples 12 and 13

Production of cast sheets

Example 12: 7 g of starch derivative from Example 4 and 3 g of triacetine were dissolved in 110 g of chloroform with stirring at 70° C. with reflux.

Example 13: 3.5 g of starch derivative from Example 6 and 1.5 g of triacetin were dissolved in 55 g of hot chloroform.

Cast sheets having the following properties were produced from these solutions respectively:
Example 12: water-clear moderately brittle sheet
Example 13: very clear soft elastic sheet.

Example 14

Production of blown films

Using the following extrusion parameters, a granulate was produced from 3 kg of starch acetate from Example 4 and 1.11 kg of a plasticizer system comprising 36.6 percent by weight of 'Citroflex', 36.6 percent by weight of diacetin, 24.4 percent by weight of monoacetin, and 2.4 percent by weight of glycerol.

BRABENDER one shaft extruder (19 mm, 25 D):
Temperature: 120°/ 145°/ 150°/ 120° C.
Speed: 40 min$^{-1}$ Using the same extruder having a blown film die and the following extrusion parameters blown films were produced from above-mentioned starch acetate granulate. The thickness of the sheets could be tailored of from 25 to 50 μm by variation of the drawdown.

The obtained starch acetate blown films were transparent.
Extrusion parameters.
Temperature: 120°/ 145°/ 150°/ 120° C.
Speed: 25 min$^{-1}$
Blow-up ratio: 2

Mechanical properties of the blown films according to the ISO standard 1184:
Tensile strength at break: 11 N/mm$^2$
Tensile strength: 14 N/mm$^2$
Percentage elongation at break: 40

Example 15

Production of flat films

Using the extruder of example 14 having a flat sheet die (135 mm) and the following extrusion parameters, flat sheets were produced from the starch acetate granulate of example 14:

Temperature: 110°/ 140°/ 150°/ 135° C.
Speed: 40 min$^{-1}$

The thickness and the width of the transparent flat sheets could be tailored of from 50 to 120 μm and 80–120 mm, respectively, by variation of the drawdown.

Mechanical properties of the flat sheet according to the ISO-standard 1184:
Tensile strength: 14 N/mm$^2$
Tensile strength at break: 11 N/mm$^2$
Percentage elongation at break: 40

Comparison Example 1

Production of starch acetate from jet-boiled starch 25 g of jet-boiled HYLON VII starch and 83 ml of acetic anhydride were heated at a temperature of 140° C. in an oil bath with stirring and were kept at this temperature for 5 hours without a reaction taking place. There was no increase in viscosity and a dissolving reaction did not take place. The mixture was suction filtered, washed twice with 200 ml of methanol in each case and then dried in air. Yield: 23 g.

Result of Comparison Example 1

A starch swollen and disintegrated by jet boiling is not in an activated state and cannot be further processed to starch derivatives without an activation step provided according to the present invention.

Comparison Example 2

Activation with subsequent neutralization

Example 1 was repeated. However, neutralization was carried out with sulfuric acid after cooling and before precipitation with methanol. Yield of precipitated product: about 120 g.

Product of Comparison Example 2 was then reacted as in Example 4. No derivatization reaction took place.

Result of Comparison Example 2

If the alkaline solution is neutralized before precipitation of the starch in step (b) of the activation process according to the present invention, the reactive hydroxy groups of the starch are not activated for a subsequent derivatization reaction, i.e., the "intermediate product" obtained after a neutralization stage is not a starch intermediate product according to the present invention which exists in a highly activated form.

It will be understood that the above description of the present invention is susceptible to various modifications, changes, and adaptations, and the same are intended to be comprehended within the meaning and range of equivalents to the appended claims.

What is claimed is:

1. A process for producing homogeneous products from an activated starch or amylose intermediate product, comprising the steps of:

(a) swelling and disintegrating starch or amylose with a dilute aqueous alkali hydroxide solution;

(b) precipitating the disintegrated starch or amylose from the agueous solution by adding a precipitant which is miscible with water;

(c) separating the precipitated disintegrated starch or amylose, comprising activated hydroxy groups, from the filtrate, producing an activated starch or amylose intermediate product adapted to produce a homogeneous product; and (d) reacting activated hydroxy groups of the activated starch or amylose intermediate product with an agent selected from the group consisting of ether, ester, urethane, carbamate, and acetal to produce a homogeneous product.

2. The process according to claim 1, wherein the agent is an alkylene oxide.

3. The process according to claim 2 wherein the derivatization agents are ethylene oxide and/or propylene oxide.

4. The process according to claim 1, wherein the agent is an organic acid or organic acid derivative.

5. The process according to claim 4, wherein the agent is selected from the group consisting of carboxylic acid anhydrides and carboxylic acid chlorides.

6. The process according to claim 4, wherein the agent is a saturated aliphatic carboxylic acid of 1 to 20 carbon atoms or a derivative thereof.

7. The process according to claim 6, wherein the agent is selected from the group consisting of acetic acid, palmitic acid and derivatives thereof.

8. The process according to claim 1, wherein the homogeneous product has a degree of substitution of 0.01 to 3.0.

9. The process according to claim 1, wherein the homogeneous product has a degree of substitution of 1.5 to 3.0.

10. The process according to claim 1, wherein the homogeneous product has a degree of substitution of 2.0 to 3.0.

11. The process according to claim 2, wherein the homogeneous product has a degree of substitution of 0.01 to 3.0.

12. The process according to claim 2, wherein the homogeneous product has a degree of substitution of 1.5 to 3.0.

13. The process according to claim 2, wherein the homogenous product has a degree of substitution of 2.0 to 3.0.

14. The process according to claim 4, wherein the homogeneous product has a degree of substitution of 0.01 to 3.0.

15. The process according to claim 4, wherein the homogeneous product has a degree of substitution of 1.5 to 3.0.

16. The process according to claim 4, wherein the homogeneous product has a degree of substitution of 2.0 to 3.0.

17. The process according to claim 1, wherein the homogeneous product is further processed by an additional step of adding plasticisers to produce starch materials.

18. The process according to claim 2, wherein the homogeneous product is further processed by an additional step of adding plasticisers to produce starch materials.

19. The process according to claim 4, wherein the homogeneous product is further processed by an additional step of adding plasticleers to produce starch materials.

20. The process according to claim 8, wherein the homogeneous product is further processed by an additional step of adding plasticisers to produce starch materials.

21. The process according to claim 17, wherein the homogeneous product in starch materials has an amylose content of at least 50% by weight.

22. The process according to claim 17, wherein the homogeneous product in starch materials has an amylose content of at least 70% by weight.

23. The process according to claim 17, wherein the homogeneous product in starch materials has an amylose content of at least 80% by weight.

24. The process according to claim 17, wherein the homogeneous product in starch materials is obtained from cornstarch or peastarch.

25. The process according to claim 21, wherein the homogeneous product in starch material is obtained from cornstarch or peastarch.

26. The process according to claim 17, wherein the starch material is further processed thermoplastically with an additional step selected from the group consisting of thermopressing, extruding or injecting to produce mouldings.

27. The process according to claim 21, wherein the starch material is further processed thermoplastically with an additional step selected from the group consisting of thermopressing, extruding or injecting to produce mouldings.

28. The process according to claim 24, wherein the starch material is further processed with an additional step selected from the group consisting of pressing, extruding or injecting to produce mouldings.

29. The process according to claim 17, wherein the starch material is further processed with an additional step of casting from solutions or dispersions to produce films and sheets.

30. The process according to claim 21, wherein the starch material is further processed with an additional step of casting from solutions or dispersions to produce films and sheets.

31. The process according to claim 24, wherein the starch material is further processed with an additional step of casting from solutions or dispersions to produce films and sheets.

* * * * *